United States Patent
Fraser

(10) Patent No.: US 7,151,381 B2
(45) Date of Patent: Dec. 19, 2006

(54) GRAIN MOISTURE SENSOR

(76) Inventor: William D. Fraser, 715-10th Street, Brandon, Manitoba (CA) R7A 4G7

(*) Notice: Subject to any disclaimer, the term of this patent is extended or adjusted under 35 U.S.C. 154(b) by 0 days.

(21) Appl. No.: 11/373,489

(22) Filed: Mar. 13, 2006

(65) Prior Publication Data

US 2006/0261822 A1    Nov. 23, 2006

Related U.S. Application Data

(63) Continuation-in-part of application No. 10/853,118, filed on May 26, 2004, now abandoned.

(51) Int. Cl.
*G01R 27/26* (2006.01)
(52) U.S. Cl. .................... 324/664; 324/663; 324/689
(58) Field of Classification Search ............. 324/664, 324/665, 668, 652, 689
See application file for complete search history.

(56) References Cited

U.S. PATENT DOCUMENTS

| | | | |
|---|---|---|---|
| 1,890,545 A | 12/1932 | Limbrick | |
| 2,266,114 A | 12/1941 | Bartlett | |
| 2,422,742 A | 6/1947 | Odessey | |
| 2,693,575 A | 11/1954 | Greenwood et al. | |
| 4,066,951 A * | 1/1978 | Wang | 324/689 |
| 4,147,976 A * | 4/1979 | Wang | 324/689 |
| 4,193,116 A | 3/1980 | Funk | |
| 4,462,250 A | 7/1984 | Stuart | |
| 4,584,522 A | 4/1986 | Varela | |
| 5,189,812 A | 3/1993 | Ediger | |
| 5,663,650 A | 9/1997 | McMahon | |
| 6,285,198 B1 | 9/2001 | Nelson | |
| 6,437,582 B1 | 8/2002 | Rode et al. | |
| 6,570,395 B1 | 5/2003 | Falbo et al. | |

* cited by examiner

*Primary Examiner*—Andrew H. Hirshfeld
*Assistant Examiner*—John Zhu
(74) *Attorney, Agent, or Firm*—Adrian D. Battison; Michael R. Williams; Ryan W. Dupuis

(57) ABSTRACT

A grain moisture meter has a test cell for containing a sample of the particulate material to be tested. A single oscillator includes a variable frequency tuned circuit including the test cell as a capacitor, a calibrated variable standard capacitor, a calibrating capacitor and a variable trimming capacitor. A frequency monitor generates DC voltage outputs of opposite polarity according to whether the output frequency of the oscillator is greater than or less than the selected frequency and displays the frequency difference as zero when the circuit is tuned. The calibrating capacitor is operator adjustable and a fixed reference capacitor and a reference number are provided to allow the operator to set the calibrating capacitor.

4 Claims, 3 Drawing Sheets

1 – OFF
2 – REFERENCE
3 – CALIBRATE
4 – OPERATE

GRAIN MOISTURE SENSOR

This application is a continuation-in-part application from application Ser. No. 10/853,118 filed May 26$^{th}$ 2004 and now abandoned.

This invention relates to an improved device for determining certain properties of particulate materials, most particularly the moisture content of grains and similar materials.

BACKGROUND OF THE INVENTION

The moisture content of grains and like material has a significant impact on the market value of the grain. If grains have too high of moisture content they will sell for less than those in an appropriate moisture range. Therefore, an accurate and precise means of testing moisture content in grain will help farmers monitor their crops. With the aid of monitoring, farmers may dry their grain until the preferred moisture content is achieved. This will minimize energy input while increasing grain value.

There are many grain moisture sensing devices found in the patent literature. Greenwood et al. Canadian patent 510356, issued Feb. 22, 1955, which corresponds to U.S. Pat. No. 2,693,575 issued December 1951, describes a device allowing a relatively unskilled operator to measure moisture content of a sample rapidly by measuring its dielectric properties. This device has proven to be very successful in the grain industry and has become a preferred instrument of many organizations in that industry, for example the Canadian Grain Commission. Thus it acts as a standard in many situations and remains therefore a widely used and effective tool for measuring grain moisture. This remains so despite its using old technology, so that it has not been superseded by recent developments using technology which is potentially much more accurate and effective. The device is rugged and of basically simple components such as manually adjustable capacitors.

Unfortunately, the manufacture and maintenance of this device has become difficult due to the age of the technology. The device has two vacuum tube oscillators with an operating frequency of several MHz, requiring the use of specially wound inductance coils. Manufacturers have discontinued or are discontinuing production of those components. Hence, it is becoming increasingly more difficult to acquire them for either manufacture or repair. It is clear that the device is in need of an update to use components that are currently readily available.

In addition to the concerns over manufacture and repair, there are certain deficiencies in the original device. For example, the length of time for temperature stabilization of the electronics and uncertainties in setting a calibrated standard capacitor using an analogue milliammeter. On the latter point, with the prior art meter, the needle of the ammeter has only positive readings. The capacitor is adjusted to achieve the desired zero current state. The dial reading is positive regardless of whether the capacitance is too high or too low. In adjustment, the dial needle moves to one end of the dial as the measured current output approaches zero. On passing through the point of zero current, the reading begins to rise again, as the needle moves back to the opposite end of the dial. This makes it very difficult to determine the exact point at which the reading is at a minimum and the capacitor is adjusted correctly to provide an accurate reading.

One clearly desirable approach would be to manufacture a new device of a new design using modern technology and modern components and a number of attempts to do this have been made although none have had significant success primarily in view of the fact that the above device remains a standard and thus is not easily displaced.

Another approach is to modify the construction of the existing equipment so that the basic components of the housing, the cell for receiving the sample, its mounting on the housing and the manually variable capacitors remain unchanged but the electronic components are modified for improved operation.

SUMMARY OF THE INVENTION

According to the present invention there is provided a meter for measuring the dielectric constant of a particulate material to be tested, the meter comprising:

a housing;

a test circuit within the housing;

a test cell for containing a sample of the particulate material to be tested;

the test cell being arranged to be mounted on the housing and so as to be connected into the test circuit;

the test cell including two electrodes in the test cell for receiving the sample of particulate material to be tested as a dielectric between the electrodes, such that the capacitance of the test cell is a function of the dielectric constant of the sample of particulate material;

the test circuit including a manually adjustable variable standard capacitor which is manually adjustable by an operator by a first manual control on the housing;

an indicator on the housing coupled to the variable standard capacitor for displaying a value indicative of a capacitance setting of the variable standard capacitor;

the test circuit including a manually adjustable trimming capacitor which is manually adjustable by an operator by a second manual control on the housing;

the test circuit including a calibrating capacitor;

the test circuit including a single oscillator for generating a single oscillator output at a frequency which is varied in dependence on a capacitance of the test cell;

the single oscillator including a tuned circuit for varying the frequency of the oscillator output, the tuned circuit including capacitors defined by:

the test cell;

the calibrated variable standard capacitor; and the variable trimming capacitor;

the calibrating capacitor;

a frequency monitor for comparing the single output frequency of the single oscillator with a selected frequency;

a display for displaying a frequency difference value representing a difference between the single output frequency of the oscillator and the selected frequency;

the test circuit including a manually operable switch;

the switch being actuable to a calibrate mode in which the calibrating capacitor, the trimming capacitor, the variable standard capacitor and the test cell when empty of the sample connected in the circuit to allow setting of the variable standard capacitor to a predetermined capacitance setting as displayed on the indicator and adjustment of the trimming capacitor to effect tuning of the frequency of the tuned circuit to the selected frequency;

the switch being actuable to an operate mode in which the calibrating capacitor is disconnected from the circuit, with the trimming capacitor, the variable standard capacitor and the test cell when filled with the sample connected in the circuit to allow setting of the variable standard capacitor to an indicated capacitance setting as displayed on the indicator to effect tuning of the frequency of the tuned circuit to the selected frequency;

the display is a digital display arranged to display the frequency difference value as zero when the output frequency of the oscillator equals the selected frequency, and to display the frequency difference value as a positive value when the output frequency of the oscillator is greater than the selected frequency and to display the frequency difference value as a negative value when the output frequency of the oscillator is less than the selected frequency.

Preferably the frequency monitor comprises two inductors arranged for generating DC voltage outputs of opposite polarity according to whether the output frequency of the oscillator is greater than or less than the selected frequency and arranged such that, when the output frequency is at the selected frequency, both inductors produce a voltage that cancels each other so that an output voltage is zero and such that, as the output frequency is varied higher than the selected frequency, one of the inductors produces a higher voltage while the other produces a lower voltage to produce an output voltage which is of a positive value and such that, as the output frequency is varied lower than the selected frequency, the other of the inductors produces a higher voltage while said one of the inductors produces a lower voltage to produce an output voltage which is of a negative value.

In accordance with another important aspect, preferably the calibration capacitor is manually adjustable by the operator and wherein there is provided a fixed reference capacitor mounted within the housing and the test circuit can be switched to a reference mode to indicate whether the trimming capacitor is accurately set.

According to a second aspect of the invention which is independent of the above feature, there is provided a meter for measuring the dielectric constant of a particulate material to be tested, the meter comprising:

a housing;

a test circuit within the housing;

a test cell for containing a sample of the particulate material to be tested;

the test cell being arranged to be mounted on the housing and so as to be connected into the test circuit;

the test cell including two electrodes in the test cell for receiving the sample of particulate material to be tested as a dielectric between the electrodes, such that the capacitance of the test cell is a function of the dielectric constant of the sample of particulate material;

the test circuit including a manually adjustable variable standard capacitor which is manually adjustable by an operator by a first manual control on the housing;

an indicator on the housing coupled to the variable standard capacitor for displaying a value indicative of a capacitance setting of the variable standard capacitor;

the test circuit including a manually adjustable trimming capacitor which is manually adjustable by an operator by a second manual control on the housing;

the test circuit including a calibrating capacitor;

the test circuit being arranged to compare an output frequency of an oscillating circuit with a selected tuned frequency;

a display for displaying whether the output frequency is equal to the selected frequency;

the test circuit including a manually operable switch;

the switch being actuable to a calibrate mode in which the calibrating capacitor, the trimming capacitor, the variable standard capacitor and the test cell when empty of the sample connected in the circuit to allow setting of the variable standard capacitor to a predetermined capacitance setting as displayed on the indicator and adjustment of the trimming capacitor to effect tuning of the frequency of the tuned circuit to the selected frequency;

the switch being actuable to an operate mode in which the calibrating capacitor is disconnected from the circuit, with the trimming capacitor, the variable standard capacitor and the test cell when filled with the sample connected in the circuit to allow setting of the variable standard capacitor to an indicated capacitance setting as displayed on the indicator to effect tuning of the frequency of the tuned circuit to the selected frequency;

wherein the calibration capacitor is manually adjustable by the operator;

wherein there is provided a fixed reference capacitor mounted within the housing;

and wherein the test circuit can be switched to a reference mode to indicate whether the trimming capacitor is accurately set.

Preferably, in the reference mode, the fixed reference capacitor, the trimming capacitor and the variable standard capacitor are connected in the test circuit with the cell and the calibrating capacitor disconnected from the test circuit.

Preferably the switch includes a further switch position for switching the test circuit to the reference mode.

Preferably there is provided reference number with the meter which is arranged to be used with the reference capacitor to indicate whether the trimming capacitor is accurately set.

Preferably the reference capacitor, the reference number and the test circuit are arranged such that,
  a) with the switch in the calibrate mode, such that the calibrating capacitor, the trimming capacitor, the variable standard capacitor and the test cell when empty of the sample are connected in the test circuit, and the variable standard capacitor is set to a predetermined capacitance setting as displayed on the indicator and the trimming capacitor is set to an operator adjusted position to effect tuning of the frequency of the tuned circuit to the selected frequency;
  b) with the switch in the reference mode, such that the cell and the calibrating capacitor are disconnected from the circuit so that the reference capacitor, the trimming capacitor and the variable standard capacitor are connected in the test circuit, while the trimming capacitor remains set to the operator adjusted position, the variable standard capacitor is set to the reference number to indicate whether the trimming capacitor is accurately set.

Preferably the reference capacitor, the reference number and the test circuit are arranged such that the trimming capacitor is accurately set if the circuit is tuned to the selected frequency when the trimming capacitor remains set to the operator adjusted position and the variable standard capacitor is set to the reference number.

The dielectric constant of a sample can be determined as a function of the capacitance of the calibrated variable standard capacitor, as shown on the indicator. The indicator reading is be converted directly to a sample moisture content by reference to standard tabular data.

Because the frequency difference passes from positive to negative, rather than dipping to a minimum and rising again, it is much easier to detect the desired zero point. This ability is further enhanced with the digital display which provides positive and negative non-zero readings and an unequivocal zero reading at the desired frequency.

The frequency monitor is preferably a tuned circuit, as opposed to the second oscillator of the prior art. This allows the use of readily available, off-the-shelf components and considerably reduced complexity. Manufacture may be simpler, using printed circuit board technology.

The device uses the same operating procedure as the prior art device and the same tabular data for the indicator settings so that a standardization of the device with new tabular data for approval by the relevant authorities is unnecessary.

BRIEF DESCRIPTION OF THE DRAWINGS

In the accompanying drawings, which illustrate an exemplary embodiment of the present invention.

DETAILED DESCRIPTION

Figure 1:
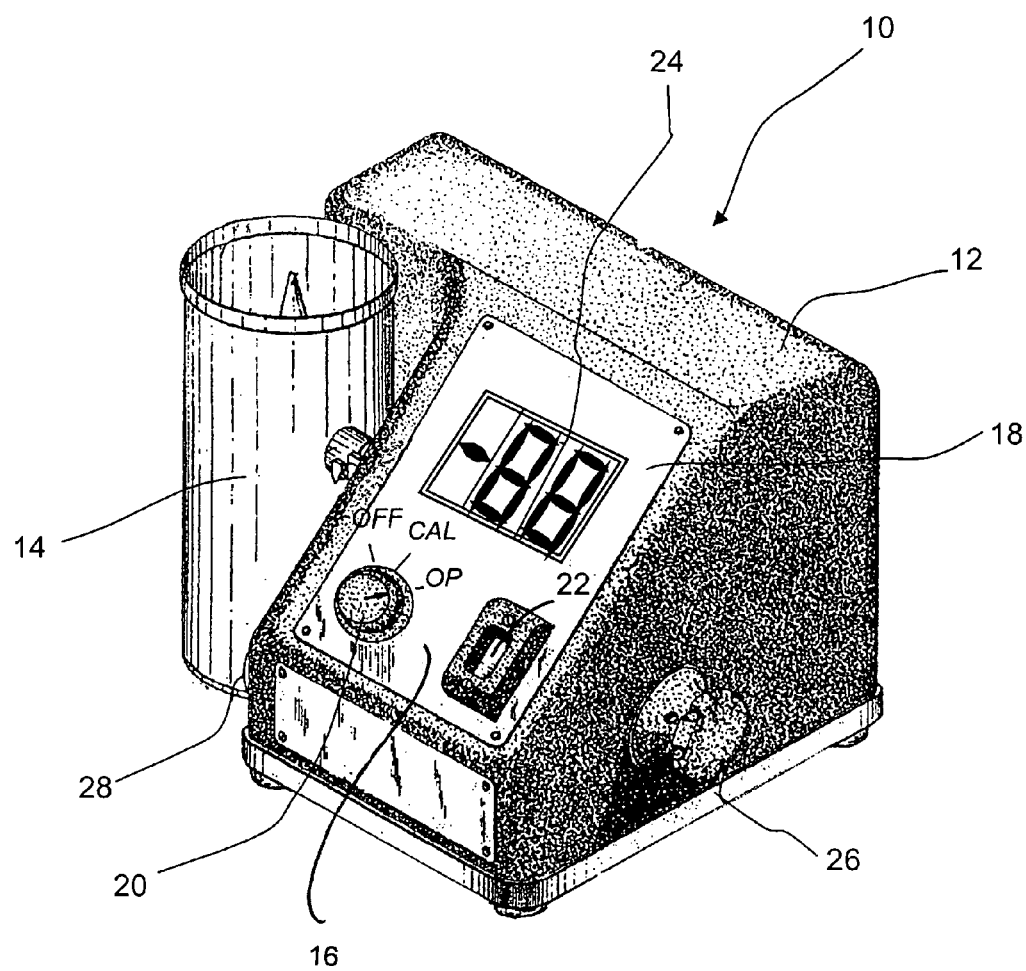
FIG. 1 is a perspective view of a device according to the present invention.

Referring to the accompanying drawings, there is illustrated a moisture tester 10 having a housing 12 and a test cell 14 for containing a sample of material to be tested. The configuration of the test cell and its mounting and connection to the housing are as described in CA 510,356. The front face 16 of the housing carries a panel 18 on which is mounted a multi-position switch 20 with "off", "calibrate" and "operate" positions. The panel 18 also carries an indicator dial 22 for a standardized variable capacitor $C_s$ (FIG. 3) and a two digit digital display 24. On one side of the housing is a knob 26 for adjusting the standardized variable capacitor with which the dial 22 is associated, while a trim knob 28 is mounted on the opposite side of the housing for adjusting a trimming capacitor. These components have equivalents in the device described in CA 510356, to which the reader is referred.

Figure 2:
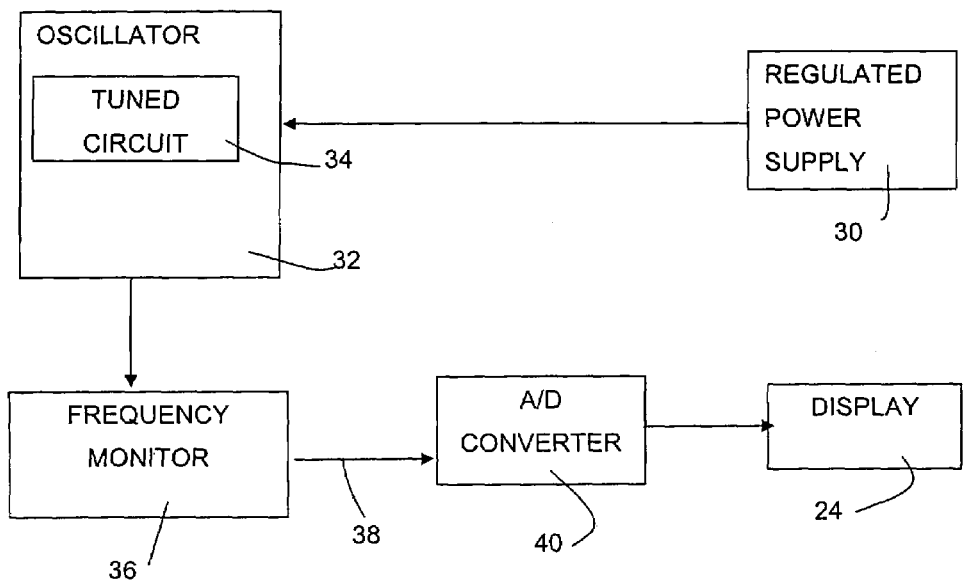
FIG. 2 is a block diagram of the circuit of the device.

Turning to FIG. 2, the device according to the present invention has a regulated power supply 30. This is the source of all power used in the device. An oscillator 32 is coupled to a tuned circuit 34 that is used for adjusting the frequency of the oscillator output. The oscillator output is delivered to a frequency monitor 36, which produces a DC output 38 as input to an analogue to digital converter 40. The output from converter 40 serves as the input to the digital display 24.

Figure 3:
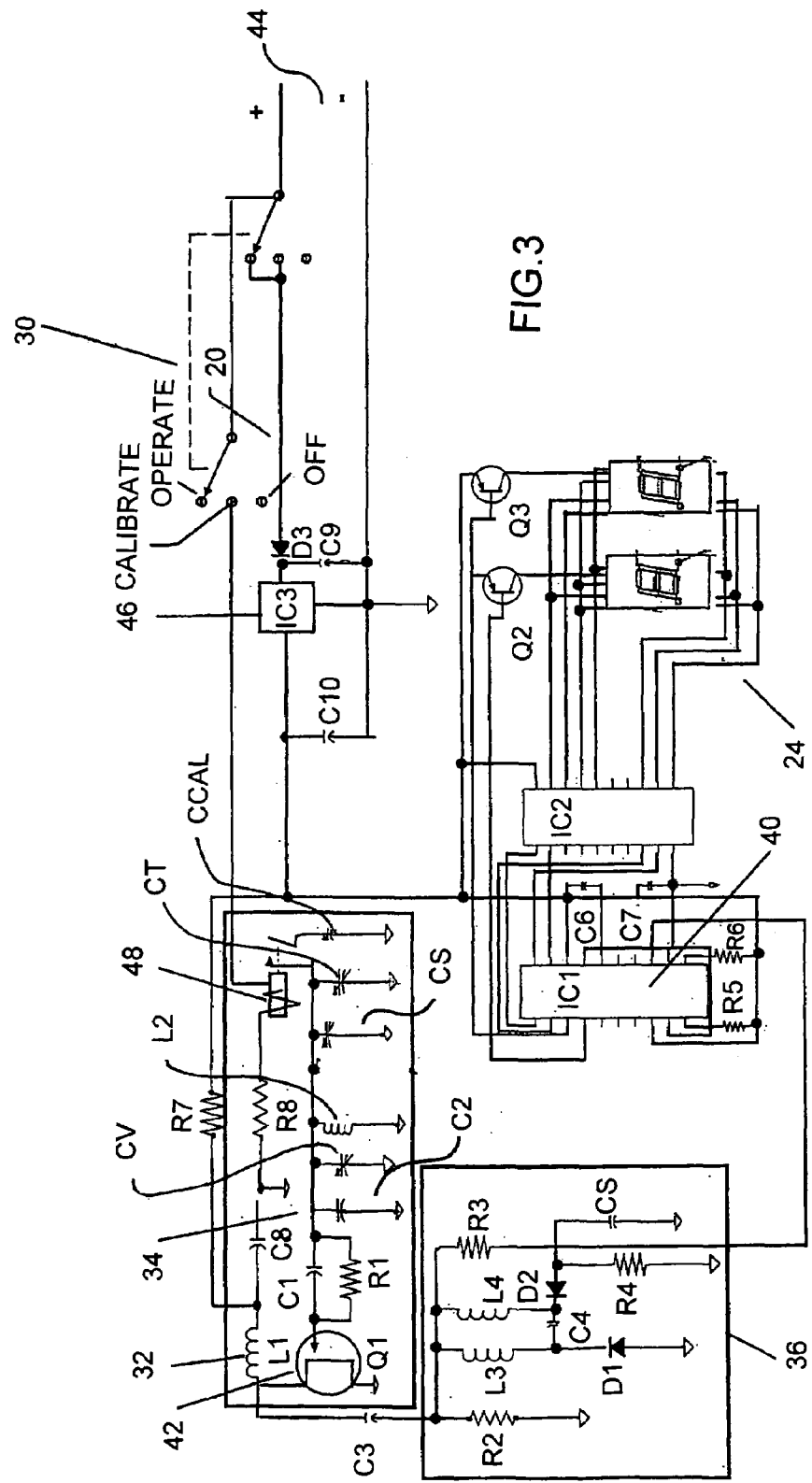
FIG. 3 is a more detailed schematic of a preferred embodiment of the circuit.

Turning now to the details of the circuit as shown in FIG. 3 and as described in more detail in the prior patent of Greenwood it will be noted that a number of capacitors are shown as follows:

$C_2$ is a fixed capacitor provided merely to give a level of capacitance of the required amount;

$C_V$ is the null capacitor which is manually variable by operating the control knob 28;

$C_s$ is the drum or variable standard capacitor which is manually variable by operating the control knob 26 and is connected to the indicator dial 22 which indicates a varying dial reading as the capacitor is adjusted;

$C_T$, is the cell into which the sample to be measured is to be inserted.

As described in the above patent of Greenwood, the empty cell is first connected to the side of the unit by means of a hanger and a coaxial terminal by which the cell is connected electronically into its position as indicated at CT in FIG. 3.

The switch is then moved to the on position thus connecting the power to the circuit. The switch is then moved to the calibration position thus bringing into the circuit the calibrating condenser $C_{CAL}$. The drum or variable standard capacitor $C_S$ is then adjusted by the control knob 26 until a predetermined dial reading shows in the display 22, the predetermined dial reading being set according to the standards for use of the product with a particular material to be tested. This position is a calibrating position. The null or trimming capacitor $C_V$ is then adjusted by the control knob 28 until there is a minimum flow of current in the circuit, this minimum flow being shown on the meter 24. When this minimum flow is obtained, the instrument is calibrated ready for use and the switch is opened thus taking the standard condenser $C_{CAL}$ out of the circuit. The switch is thus moved to the operating position so that the switch is in a position which indicates "operate" as a contrast to "calibrate"

A sample of the grain or the material to be tested is then carefully weighed as specified on the chart supplied with the instrument. The temperature of the sample is ascertained prior to the test being taken and this is done by a standard method as also set forth in the charts associated with the device.

This weighed sample is placed within the cell for testing. The sample now loaded within the test cell changes the capacitance of the cell indicated at $C_T$ thus detuning the resonant circuit. The drum or standard capacitor $C_S$ is then manually adjusted by means of the control knob 26 until once again there is a minimum current flow within the circuit as indicated at the meter 24.

The reading of the standard condenser $C_S$ at the display 22 is then read to provide a number which is compared to a chart prepared for the material being tested whereupon the percentage moisture can be read from the chart. In this connection it will be appreciated that charts are provided for any material being tested, these charts being prepared by the collation of test determination of moistures by laboratory methods.

In the device as shown by Greenwood, there are two oscillators which are provided so as to compare the oscillation of the circuit containing the capacitors with a comparison oscillator.

Referring to the more detailed circuit drawing in FIG. 3, it will be seen that a single oscillator 32 in this embodiment is an Armstrong tuned-gate oscillator using a field effect transistor (FET) 42. The tuned circuit 34 includes inductor $L_2$ and the above capacitors $C_V$, $C_S$, $C_T$, and $C_{CAL}$.

This provides an oscillating voltage to the gate of the FET through a blocking capacitor $C_1$ when excited. The drain current through inductor $L_1$, the tickler coil, varies sympathetically. It is inductively coupled to inductor $L_2$ of the tuned circuit to provide the requisite feedback. Variations in the capacitance of circuit 34 change the frequency of oscillation. For present purposes a frequency of about 18 MHz is appropriate. This circuit is "series-fed", with the bias and the signal flowing in the same drain circuit.

The power supply 30 includes the power source 44, conveniently a battery, the three pole, double throw switch 20 and a voltage regulator 46. The regulator is shunted with capacitors $C_9$ and $C_{10}$ to provide a good ground for the signal.

In the off position of switch 20, the power supply is disconnected. When it is moved to the "calibrate" position, power is delivered to the drain circuit and the circuit to relay switch 48 is completed to close the switch and connect capacitor $C_{CAL}$ in parallel with capacitors $C_V$, $C_S$, $C_T$, and inductor $L_2$ for initial calibration of the meter as described above.

In the "operate" position of the switch, relay switch 48 is open and the calibration capacitor $C_{CAL}$ is disconnected from the tuned circuit 34 also as described above and the capacitor $C_s$ is adjusted to bring the current back to the minimum position for obtaining the value on the display 22.

The drain circuit signal is passed through capacitor $C_3$ to the frequency monitor 36. The frequency monitor includes a second tuned circuit, itself including two inductor coils $L_3$ and $L_4$, both connected to the oscillator output and connected in series with an intervening capacitor $C_4$. Inductor $L_3$ is connected to the cathode of a diode $D_1$, with its anode grounded. Inductor $L_4$ is connected to the cathode of a diode $D_2$, with its anode connected to a voltage divider consisting of resistors R3 and $R_4$. The AC output of the circuit 36 is grounded through capacitor $C_5$. Appropriate selection of the coils $L_3$ and $L_4$ along with the associated components in circuit 36 yields a circuit that acts as an electronic "teeter totter" or "see saw". At one particular frequency, (about 18 MHz), the coils produce voltages that cancel one another so that the DC circuit output is zero. As the input frequency increases, the voltage of coil $L_3$ increases, while that of $L_4$ decreases, yielding a positive output voltage. With decreasing frequency, the voltage of coil $L_4$ increases and that of $L_3$ decreases, yielding a negative output voltage.

The DC output from circuit 36 goes to A/D converter 40 and thence to digital display 24. The resistors R5 and R6 balance the converter 40 to yield a "0" output with a 0 volt input.

The operating procedure for the device is the same as the prior art device as described above, with the exception of the relatively long warm-up time that is not required with the new apparatus. Initially, with the test cell 14 empty, the switch 20 is set to the "calibrate" position to connect the capacitor $C_{cal}$. The drum or standardized variable capacitor $C_S$ is then adjusted to the predetermined reading on the indicator 22. The null or trimming capacitor $C_V$ is then adjusted to produce a null or zero output on the display 24. At this point, the frequency of the oscillator matches that of the tuned frequency monitor circuit 36. The switch 20 is then set to the "operate" position, taking the calibrating capacitor $C_{cal}$ out of the circuit. A sample of material to be tested is then added to the test cell. This alters the test cell capacitor $C_T$ and with it the oscillator frequency, resulting in a non-zero output from the frequency monitor.

To bring the oscillator frequency back to that of the tuned frequency monitor circuit, the standardized variable capacitor $C_S$ is adjusted to produce a zero reading on the display 24. The reading on the indicator dial 22 may then be compared to standard tabular data to determine the moisture content of the material, as done with the prior art.

While one embodiment of the present invention has been described in the foregoing, it is to be understood that other embodiments are possible within the scope of the invention and the invention is to be considered limited solely by the scope of the appended claims. Potential modifications within the abilities of those skilled in the art include: the use of different forms of variable frequency oscillator, for example a Hartley, Colpitts or Clapp oscillator; the use of an alternative to the FET as the amplifying component of the oscillator; and the use of a different frequency monitor circuit. The design described in the foregoing is currently preferred as it integrates well into the existing prior art meter for refurbishing or repair. It also uses the same operating process and tabulated standard data so that the transition from the prior art unit to the new one is, for the operator, straight forward.

Figure 4:
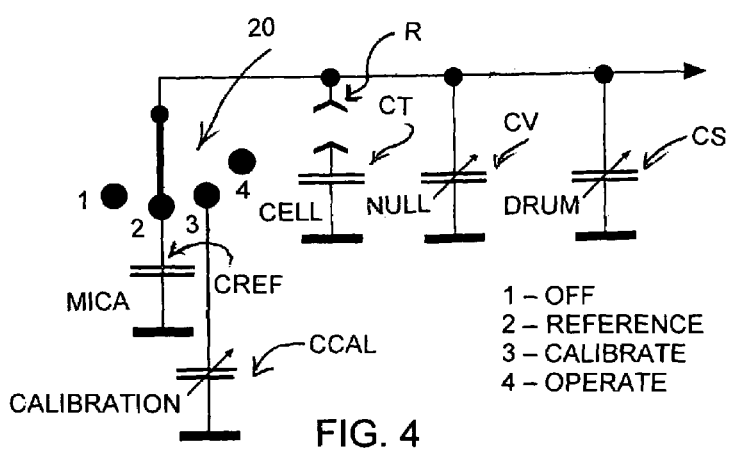
FIG. 4 is an illustration of the oscillating circuit components only of the circuit of FIG. 3 showing an additional reference capacitor and a modified switch. It will be appreciated that the remainder of the circuit in FIG. 4 is identical to that of FIG. 3.

Turning now to FIG. 4 there is shown a modification of the circuit shown in FIG. 3. In this modification firstly the switch 20 is changed so that is now a four-position switch as opposed to a three position switch of FIG. 3. These positions are indicated at 1, 2, 3 and 4 where the positions are as follows:

Position 1 is an off position in which movement of the manually operable switch member to the position 1 turns off the operation of the circuit and disconnects the power.

Position 2 is a new position which includes a reference capacitor $C_{REF}$.

Position 3 is the same as the calibrate position of FIG. 3 and includes the capacitor $C_{CAL}$.

Position 4 is the operate position which is the same as in FIG. 3 in which the operation as previously described is carried out to obtain the measured number from the display 22 relating to the variable capacitor $C_S$.

In the embodiment of FIG. 4 the capacitor $C_{CAL}$ is modified so that it is operator variable. In the previous embodiment the capacitor $C_{CAL}$ is a sealed capacitor adjusted only at the factory or repair shop where an authorized person can calibrate the system to set the capacitor $C_{CAL}$ to the required capacitance value to ensure that the system operates accurately.

It is well known that mistreatment or even minor impact on the meter can cause sufficient movement or damage to affect the calibration. The user becomes aware of such a variation in the operation only when a test is carried out on material at another location which indicates that the meter is inaccurate. Thus commonly a user of the meter will meter the material using his own meter and will then take the material to another location where a test is carried out by another body using a separate meter. If the meters disagree then it becomes clear that one of the meters is inaccurate and requires re-calibration. Normally such recalibration can only occur if the meter is sent back to an authorized or equipped repair shop.

In the present arrangement as shown in FIG. 4, the operator can recalibrate his own machine using the position 2 and the capacitor $C_{REF}$.

In addition to the provision of the capacitor $C_{REF}$, the machine is also supplied with a reference number which is calculated initially by the repair shop or other skilled facility.

In the recalibration process, the operator firstly switches switch to position 3 which is the normal calibration position. It will be appreciated in this regard that the calibration at position 3 is carried out in each metering action so as to take into account temporary variations in humidity and temperature which can affect the meter.

In this position and in the normal calibrating action with the empty cell in place, the drum or standard variable capacitor $C_S$ is moved to the required setting as set forth in the charts. The null or trimming capacitor $C_V$ is then operated to bring the frequency to the required tuned position in which the current identified on the display 24 is zero.

With the capacitor $C_V$ so adjusted, the switch is moved to position 2 which disconnects the capacitor $C_{CAL}$ and connects into the circuit in its place capacitor $C_{REF}$. At the same time the cell $C_T$ is disconnected.

In this position of the switch, the standard variable capacitor $C_S$ is adjusted to the reference number which differs from the standard number from the charts which has previously been set. During this adjustment the trimming capacitor $C_V$ remains unchanged. When moved to the reading provided by the reference number, the frequency should be tuned and therefore the current measured and displayed on the display 24 should be zero. If it is not zero then the instrument is not properly calibrated and is necessary to effect a recalibration.

The capacitor $C_{REF}$ replaces the approximate value of the empty cell and the calibration capacitor $C_{CAL}$. Even though the value of the capacitor $C_{REF}$ is the same for each meter, this difference will be relatively small in respect of different meters. This difference can be accommodated by the supply of the reference number which is calculated for each meter and is different for respective meters and is stamped on the meter at a suitable location using suitable materials.

When the reference number is used to enter this reading onto the standard variable capacitor $C_S$, the display should read zero if the meter is properly calibrated. If the display does not show zero, the meter is not properly calibrated and the operator can adjust the null capacitor $C_V$ to place the null capacitor in the proper position.

With the null capacitor $C_V$ in the proper position, the switch is put back into the calibration position number 3 with the empty cell thus connected back into the circuit. While the null capacitor $C_V$ remains at its set position and with the drum capacitor $C_S$ moved to the required position as set forth on the chart, the calibration capacitor $C_{CAL}$ can now be adjusted until the display reads zero. Thus the calibration capacitor $C_{CAL}$ is now adjusted to the required value to properly recalibrate the system. The calibration capacitor $C_{CAL}$ then remains in this position unchanged and uncorrected during further use of the system until it is determined that the meter has again out of proper calibration.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

The invention claimed is:

1. A meter for measuring the dielectric constant of a particulate material to be tested, the meter comprising:
   a housing;
   a test circuit within the housing;
   a test cell for containing a sample of the particulate material to be tested;
   the test cell being arranged to be mounted on the housing and so as to be connected into the test circuit;
   the test cell including two electrodes in the test cell for receiving the sample of particulate material to be tested as a dielectric between the electrodes, such that the capacitance of the test cell is a function of the dielectric constant of the sample of particulate material;
   the test circuit including a manually adjustable variable standard capacitor which is manually adjustable by an operator by a first manual control on the housing;
   an indicator on the housing coupled to the variable standard capacitor for displaying a value indicative of a capacitance setting of the variable standard capacitor;
   the test circuit including a manually adjustable trimming capacitor which is manually adjustable by an operator by a second manual control on the housing;
   the test circuit including a calibrating capacitor;
   the test circuit including only a single oscillator for generating a single oscillator output at a frequency which is varied in dependence on a capacitance of the test cell;
   the single oscillator including a tuned circuit for varying the frequency of the oscillator output, the tuned circuit including capacitors defined by:
   the test cell;
   the calibrated variable standard capacitor; and
   the variable trimming capacitor;
   the calibrating capacitor;
   a frequency monitor for comparing the single output frequency of the single oscillator with a selected frequency;
   a display for displaying a frequency difference value representing a difference between the single output frequency of the oscillator and the selected frequency;
   the test circuit including a manually operable switch;
   the switch being actuable to a calibrate mode in which the calibrating capacitor, the trimming capacitor, the variable standard capacitor and the test cell when empty of the sample are connected in the circuit to allow setting of the variable standard capacitor to a predetermined capacitance setting as displayed on the indicator and to allow adjustment of the trimming capacitor to effect tuning of the frequency of the tuned circuit to the selected frequency;
   the switch being actuable to an operate mode in which the calibrating capacitor is disconnected from the circuit, and in which the trimming capacitor, the variable standard capacitor and the test cell when filled with the sample are connected in the circuit to allow setting of the variable standard capacitor to an indicated capacitance setting as displayed on the indicator to effect tuning of the frequency of the tuned circuit to the selected frequency;
   wherein the display is a digital display arranged to display the frequency difference value as zero when the output frequency of the oscillator equals the selected frequency, and to display the frequency difference value as a positive value when the output frequency of the oscillator is greater than the selected frequency and to display the frequency difference value as a negative value when the output frequency of the oscillator is less than the selected frequency.

2. The meter according to claim 1 wherein the frequency monitor comprises two inductors arranged for generating DC voltage outputs of opposite polarity according to whether the output frequency of the oscillator is greater than or less than the selected frequency and arranged such that, when the output frequency is at the selected frequency, both inductors produce a voltage that cancels each other so that an output voltage is zero and such that, as the output frequency is varied higher than the selected frequency, one of the inductors produces a higher voltage while the other produces a lower voltage to produce an output voltage which is of a positive value and such that, as the output frequency is varied lower than the selected frequency, the other of the inductors produces a higher voltage while said one of the inductors produces a lower voltage to produce an output voltage which is of a negative value.

3. The meter according to claim 1 wherein:
   the calibrating capacitor is manually adjustable by the operator;
   the test circuit includes a fixed reference capacitor mounted within the housing;
   the switch is actuable to a reference mode in which the fixed reference capacitor, the trimming capacitor and the variable standard capacitor are connected in the test circuit and the cell and the calibrating capacitor are disconnected from the test circuit;

the meter includes therewith information defining a reference number related to the meter;

and the reference capacitor and the test circuit are arranged such that:
   a.) with the switch in the calibrate mode the variable standard capacitor is set to a predetermined capacitance setting as displayed on the indicator and the trimming capacitor is set to an operator adjusted position to effect tuning of the frequency of the tuned circuit to the selected frequency;
   b.) with the switch in the reference mode, while the trimming capacitor remains set to the operator adjusted position, the variable standard capacitor is set to the reference number;
   c) if the circuit is tuned to the selected frequency while the trimming capacitor remains set to the operator adjusted position and the variable standard capacitor is set to the reference number, the trimming capacitor is accurately set;
   d.) if the trimming capacitor is not accurately set so that the circuit is not tuned to the selected frequency, the operator adjusts the trimming capacitor to a selected position to tune the circuit to the selected frequency;
   e.) with the trimming capacitor set to the selected position and with the switch is moved to the calibrate mode, the variable standard capacitor is set again to the predetermined capacitance setting and the circuit is again tuned to the selected frequency by adjusting the calibrating capacitor to a position which is maintained as a calibrated position for further calibration in accordance with a) above.

4. A meter for measuring the dielectric constant of a particulate material to be tested, the meter comprising:
a housing;
a test circuit within the housing;
a test cell for containing a sample of the particulate material to be tested;
the test cell being arranged to be mounted on the housing and so as to be connected into the test circuit;
the test cell including two electrodes in the test cell for receiving the sample of particulate material to be tested as a dielectric between the electrodes, such that the capacitance of the test cell is a function of the dielectric constant of the sample of particulate material;
the test circuit including a manually adjustable variable standard capacitor which is manually adjustable by an operator by a first manual control on the housing;
an indicator on the housing coupled to the variable standard capacitor for displaying a value indicative of a capacitance setting of the variable standard capacitor;
the test circuit including a manually adjustable trimming capacitor which is manually adjustable by an operator by a second manual control on the housing;
the test circuit including a calibrating capacitor;
the test circuit being arranged to compare an output frequency of an oscillating circuit with a selected tuned frequency;
a display for displaying whether the output frequency is equal to the selected frequency;
the test circuit including a manually operable switch;
the switch being actuable to a calibrate mode in which the calibrating capacitor, the trimming capacitor, the variable standard capacitor and the test cell when empty of the sample connected in the circuit to allow setting of the variable standard capacitor to a predetermined capacitance setting as displayed on the indicator and adjustment of the trimming capacitor to effect tuning of the frequency of the tuned circuit to the selected frequency;
the switch being actuable to an operate mode in which the calibrating capacitor is disconnected from the circuit, with the trimming capacitor, the variable standard capacitor and the test cell when filled with the sample connected in the circuit to allow setting of the variable standard capacitor to an indicated capacitance setting as displayed on the indicator to effect tuning of the frequency of the tuned circuit to the selected frequency;
wherein the calibrating capacitor is manually adjustable by the operator;
the test circuit including a fixed reference capacitor mounted within the housing;
the switch being actuable to a reference mode in which the fixed reference capacitor, the trimming capacitor and the variable standard capacitor are connected in the test circuit and the cell and the calibrating capacitor are disconnected from the test circuit;
wherein the meter includes therewith information defining a reference number related to the meter;
and wherein the reference capacitor and the test circuit are arranged such that:
   a) with the switch in the calibrate mode the variable standard capacitor is set to a predetermined capacitance setting as displayed on the indicator and the trimming capacitor is set to an operator adjusted position to effect tuning of the frequency of the tuned circuit to the selected frequency;
   b) with the switch in the reference mode, while the trimming capacitor remains set to the operator adjusted position, the variable standard capacitor is set to the reference number;
   c) if the circuit is tuned to the selected frequency while the trimming capacitor remains set to the operator adjusted position and the variable standard capacitor is set to the reference number, the trimming capacitor is accurately set;
   d) if the trimming capacitor is not accurately set so that the circuit is not tuned to the selected frequency, the operator adjusts the trimming capacitor to a selected position to tune the circuit to the selected frequency;
   e) with the trimming capacitor set to the selected position and with the switch is moved to the calibrate mode, the variable standard capacitor is set again to the predetermined capacitance setting and the circuit is again tuned to the selected frequency by adjusting the calibrating capacitor to a position which is maintained as a calibrated position for further calibration in accordance with a) above.

* * * * *